(12) United States Patent
Souchet et al.

(10) Patent No.: US 6,409,440 B1
(45) Date of Patent: Jun. 25, 2002

(54) METHOD FOR CUTTING A PIECE OF SHEET METAL USED TO HOLD A LAYER OF NEUTRON-ABSORBING MATERIAL ON A WALL OF AN ATOMIC FUEL ASSEMBLY STORAGE RACK CELL

(75) Inventors: Jean-Paul Souchet, Carquefou; Marc Doukhan, Sautron, both of (FR)

(73) Assignee: Societe Atlantique de Techniques Avancees-ATEA-, Carquefou (FR)

( * ) Notice: Subject to any disclaimer, the term of this patent is extended or adjusted under 35 U.S.C. 154(b) by 0 days.

(21) Appl. No.: 09/556,108

(22) Filed: Apr. 21, 2000

(30) Foreign Application Priority Data

Apr. 23, 1999 (FR) .............................................. 99 05175

(51) Int. Cl.[7] .......................... B23C 3/00; G21C 19/00; G21C 19/32
(52) U.S. Cl. ....................... 409/132; 29/402.11; 29/723; 29/906; 250/506.1; 250/518.1; 376/272; 376/327
(58) Field of Search ................................ 376/287, 289, 376/290, 291, 292, 327, 333, 272, 260; 250/506.1, 507.1, 518.1; 29/402.01, 402.03, 402.08, 402.09, 402.11, 723, 906; 409/132

(56) References Cited

U.S. PATENT DOCUMENTS

| 4,960,560 A | * | 10/1990 | Machado et al. ............ 376/272 |
| 5,232,657 A | * | 8/1993 | Kovacik et al. ............ 376/272 |
| 5,384,813 A | * | 1/1995 | Loftis et al. ................ 376/272 |
| 5,629,964 A | * | 5/1997 | Roberts ...................... 376/272 |
| 5,925,204 A | * | 7/1999 | Hoffman, Sr. ............ 29/402.11 |
| 6,061,414 A | * | 5/2000 | Kopecky et al. ............ 376/272 |
| 6,118,838 A | * | 9/2000 | Robert et al. ................ 376/272 |

* cited by examiner

Primary Examiner—Daniel W. Howell
(74) Attorney, Agent, or Firm—Pearne & Gordon LLP (57) ABSTRACT

The present invention relates to a method for refurbishing an atomic fuel assembly storage rack the partitions (10) of which include a layer (14) of neutron-absorbing material between a wall (16) and a more or less rectangular piece of sheet metal (18) welded onto said wall. In this method the sheet metal is cut along each of the four sides. Once the short sides of sheet metal (18) have been cut by cutting the welding spots or by cutting it into sections the long sides are cut using a cutting head (20) that includes one to four blade-blade support assemblies (22) or one to four blades. Each blade (24) and blade support (26) is either fixed or movable.

12 Claims, 6 Drawing Sheets

METHOD FOR CUTTING A PIECE OF SHEET METAL USED TO HOLD A LAYER OF NEUTRON-ABSORBING MATERIAL ON A WALL OF AN ATOMIC FUEL ASSEMBLY STORAGE RACK CELL

DESCRIPTION

1. Field of the Invention

The present invention relates to a method for cutting a more or less rectangular piece of sheet metal that is welded onto a wall of an atomic fuel assembly storage rack cell such that a layer of neutron-absorbing material, held initially between the sheet metal and the wall, may be removed.

This type of method is used to refurbish the atomic fuel assembly storage racks by allowing new plates of neutron-absorbing material to be subsequently installed against the walls.

2. Background Art

In the nuclear industry atomic fuel assemblies are generally stored in storage racks placed in pools in which coolant water circulates.

This type of installation houses either new atomic fuel assemblies or atomic fuel assemblies that have been previously irradiated in the core of the nuclear reactor. This type of installation may be used on the actual site of the reactor or on other sites such as in reprocessing plants.

The storage racks comprise a rigid structure that contains a certain number of juxtaposed compartments the longitudinal axis of which is vertical. Each compartment, also called "cell", is intended to house an atomic fuel assembly. To this end the cross-section of the cells is similar to that of the assemblies, i.e. generally square.

The rigid structure of the storage racks can be achieved in a variety of ways. The partitions that define the cells can be obtained, for example, either by using welded feet to assemble tubes with a square cross-section or by welding parallel plates that are at right angles to one another.

Whatever technique is used to produce the rigid structure of the rack all or some of the partitions that separate the cells are generally fitted with a neutron-absorbing material that is available in a variety of forms. This neutron-absorbing material is used to absorb neutrons emitted by the fissile material contained in atomic fuel assemblies, thus reducing the distance that separates two adjoining cells to a minimum and thereby optimizing the number of atomic fuel assemblies that can be stored in a pool of given measurements.

One of the techniques used to integrate neutron-absorbing material in the partitions that separate the cells consists in placing a layer of neutron-absorbing material between each wall of the rigid structure and welding a piece of sheet metal onto said wall.

In this configuration the layer of neutron-absorbing material can be constituted by a polymer loaded with natural boron. Neutron-absorbing material of this type is marketed under the name "Boraflex".

Old storage racks fitted with such neutron-absorbing material show significant signs of aging. This aging is due to the neutron-absorbing material dissolving in the pool water when it is subjected to a high degree of radiation caused by the atomic fuel assemblies.

One of the main consequences of this deterioration in the neutron-absorbing material is a reduction in the nuclear protection that it ensured initially. It is no longer, therefore, possible to maintain the initial storage density after the material has been used for a certain length of time.

The second drawback of the neutron-absorbing material being dissolved in the pool is that it pollutes the cooling system water to an excessive degree. After the material has been used for a certain length of time the pollution reaches levels that are not acceptable under normal conditions.

The standard solution consists in replacing the rack assembly when this situation occurs in storage racks fitted with this type of neutron-absorbing material.

The inventors of European patent A-0 896 339 suggest refurbishing old storage racks built in this way by cutting the sheet metal that holds the layers of neutron-absorbing material. The sheet metal is cut along the welds, the layers of neutron-absorbing material are removed and new plates of neutron-absorbing material are set in place against the walls of the rack cells. More precisely the sheet metal is cut using a water jet or by being chipped.

This solution is an ideal alternative to replacing the rack assembly as it enables the assembly to be refurbished by replacing the layers of neutron-absorbing material while retaining its rigid structure.

However, the techniques recommended in the patent to cut the sheet metal present major drawbacks.

The use of a water jet to cut the sheet metal requires a certain degree of accuracy in the relative position of the cutting head and the sheet metal which is difficult to ensure in practice due to the uncontrollable changes that occur in the shape of the sheet metal over time. Furthermore, this technique creates liquid and solid waste that has to be treated.

The cutting technique using chipping does not present the above-mentioned drawbacks. Nevertheless, it is sometimes impossible to use this technique to cut the long sides of the sheet metal that hold the layers of neutron-absorbing material due to the space required by the tooling when operating. This is particularly the case in racks where pieces of sheet metal are cut that face each other and are only separated by limited spaces.

DISCLOSURE OF THE INVENTION

The aim of the invention is a method for cutting a piece of sheet metal used to hold a layer of neutron-absorbing material, said piece of sheet metal being welded onto a wall of an atomic fuel assembly storage rack cell. The method is used to refurbish a rack of this type and does not present the drawbacks involved when the water-jet or chipping techniques suggested in European patent A-0 896 339 are used.

According to the invention these results are obtained using a method for cutting a more or less rectangular piece of sheet metal the two short sides and two long sides of which are welded onto a surface of an atomic fuel assembly storage rack cell. This method removes a layer of neutron-absorbing material initially held between the sheet metal and said surface. The method is characterized in that it comprises the following stages:

cutting the two short sides of the sheet metal;

cutting the two long sides of the sheet metal in a continuous movement from one end of the sheet metal to the other with a cutting head that includes at least one blade-blade support assembly or at least one single blade.

Preferably, both long sides of the sheet metal are cut simultaneously with a cutting head that includes two blade-blade support assemblies or two single blades.

In one version the two long sides of the sheet metal can also be cut by making two successive passes with a cutting head that includes at least one single blade-blade support assembly or one single blade.

In another version the two long sides of two pieces of sheet metal facing each other can be cut simultaneously in a single pass with a cutting head that includes four blade-blade support assemblies or four single blades.

According to requirements each blade is either fixed or movable and operates in an alternating or rotating movement when the cutting head is displaced.

Furthermore, each blade-blade support assembly of the cutting head comprises either a fixed blade holder, a roller or similar movable blade support that is caused to rotate when the cutting head is displaced, or a movable blade support that operates with an alternating movement.

In all these configurations after the two long sides of the sheet metal have been cut the two remaining side strips are advantageously lifted by at least one lifting device, such as a base or roller, that is borne by the cutting head.

The sheet metal to be cut is generally welded onto the wall with welding spots. In this case the short sides of this sheet metal may be cut along the welding spots on said short sides either by chipping, grinding or milling.

In one version the two short sides of the sheet. metal can also be cut along the entire width of the sheet metal by grinding- or milling-off sections.

BRIEF DESCRIPTION OF THE DRAWINGS

A preferred embodiment of the invention is described below. The description is of a non-limitative example and refers to the attached figures where.

DETAILED DESCRIPTION OF A PREFERRED EMBODIMENT OF THE INVENTION

Figure 1:
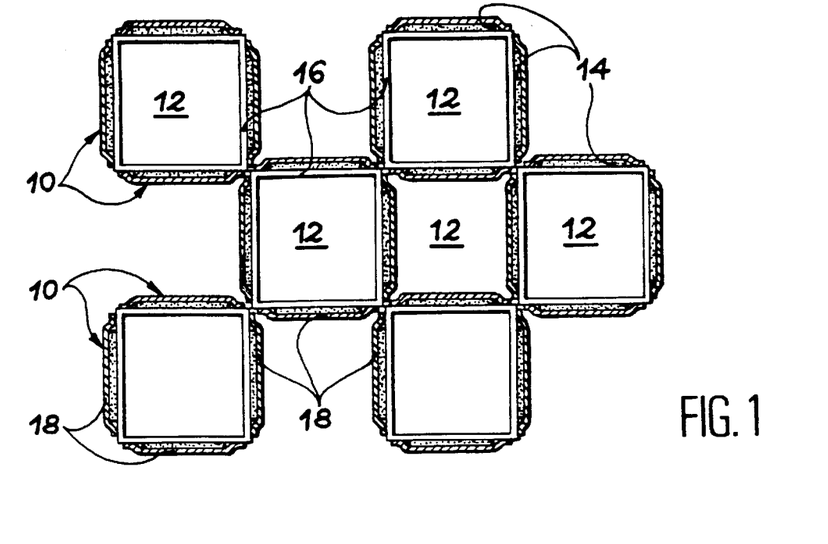
FIG. 1 is a schematic top view of a horizontal cross-section of an example of a storage rack that could be refurbished using the cutting method of the invention.

FIG. 1 shows an example of a small area of a rack intended to store irradiated atomic fuel assemblies. A rack of this type may be refurbished using the cutting method of the invention, as described below.

The rack shown in FIG. 1 mainly comprises a rigid structure constituted by vertical partitions 10 that are more or less plane and that define cells 12 with square cross-sections. Each of these cells 12 is intended to house an irradiated atomic fuel assembly.

Each cell 12 has a longitudinal axis perpendicular to the plane of FIG. 1. This axis is usually vertically oriented when the rack is placed in a pool.

The cutting method of the invention as shown in FIG. 1 concerns a storage rack in which partitions 10 comprise a layer 14 of neutron-absorbing material placed between a dividing wall 16, for example 2 to 3 mm thick, and a thin piece of sheet metal 18, for example 0.8 mm thick, that is welded onto wall 16. More precisely sheet metal 18 is preferably made of stainless steel and is more or less rectangular with rounded corners. The two long sides and two short sides of sheet metal 18 are welded onto walls 16 using welding spots or an unbroken welding line.

In this layout dividing wall 16 constitutes the rigid structure of partition 10 that separates adjoining cells 12.

In the example shown in FIG. 1 dividing walls 16 are constituted by the surfaces of a number of tubes with a square cross-section, said tubes being assembled using welded connecting feet (not shown) such that they are staggered.

In other types of racks, to which the cutting method of the invention may also be applied, dividing walls 16 consist of two rows of parallel plates that are fitted at right angles to each other such that they constitute cells 12.

In the example shown in FIG. 1 layers 14 of neutron-absorbing material are placed on the outer surface of tubes that constitute dividing walls 16. However, the layers of neutron-absorbing material may also be applied inside the tubes that constitute dividing walls 16 or alternately inside and outside the tubes and still remain within the scope of the invention.

Similarly, when the rigid structure of the rack is constituted by a number of interwoven plates the cutting method of the invention may be applied indifferently, irrespective of the surfaces to which the layers of neutron-absorbing material are applied.

The layers 14 of neutron-absorbing material are layers of polymer loaded with natural boron. Neutron-absorbing material of this type is marketed under the name "Boraflex".

Layers 14 of neutron-absorbing material are more or less rectangular layers the measurements of which are slightly smaller than those of dividing walls 16 on which said layers are held by pieces of sheet metal 18. These measurements enable the edges of sheet metal 18 to be folded beyond layers 14 of neutron-absorbing material against dividing walls 16 such that the edges of the sheet metal may be welded onto the walls to hold the layers of neutron-absorbing material.

As pieces of sheet metal 18 are fastened to walls 16 by welding spots the spaces in which layers 14 of neutron-absorbing material lie are not leaktight. Layers 14 are therefore in permanent contact with the pool water.

The cutting method of the invention usually applies to a storage rack that has been used for several years in which layers 14 of neutron-absorbing material have been subjected to a high degree of irradiation in the pool water containing the rack for a relatively long period of time. Layers 14 of neutron-absorbing material, that are in contact with the pool water, have therefore been partially dissolved in said pool water. The consequences of the layers being dissolved are a reduction in the nuclear protection between adjacent cells 12 on the one hand and pollution of the water in the pool cooling system on the other.

According to the invention the pieces of sheet metal 18 are cut along all four sides in order to remove the layers of neutron-absorbing material and to replace them with new plates of neutron-absorbing material. These operations are performed once the rack has been taken out of the pool.

According to the invention the method for cutting the pieces of sheet metal 18 comprises two operations. The first of these operations consists in cutting the short sides of each piece of sheet metal. The second of these operations consists in cutting the long sides of the pieces of sheet metal 18. Both cutting operations are performed near the welds that fasten pieces of sheet metal 18 to walls 16 in order to remove layers 14 of neutron-absorbing material that lie under said pieces of sheet metal 18.

Figure 9A:
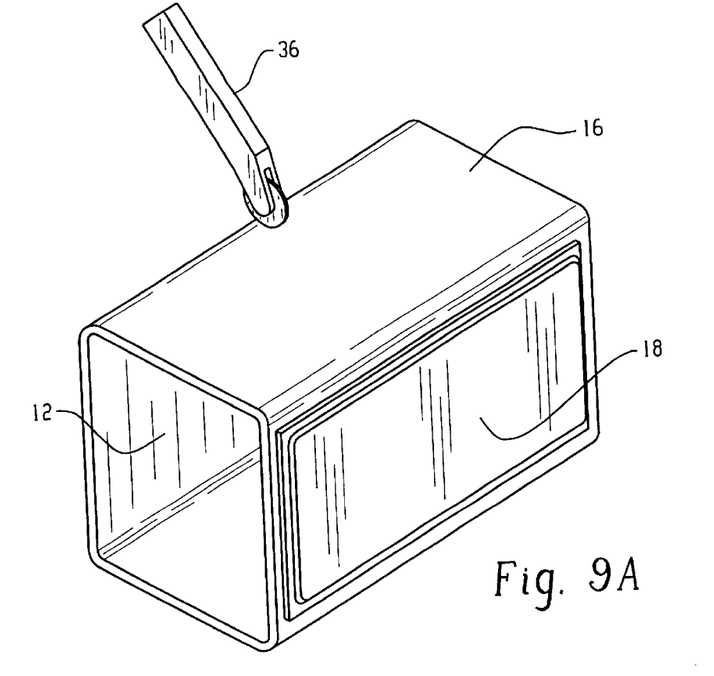
FIGS. 9A and 9B illustrate the short sides of the sheet metal being cut into sections.
Figure 9B:
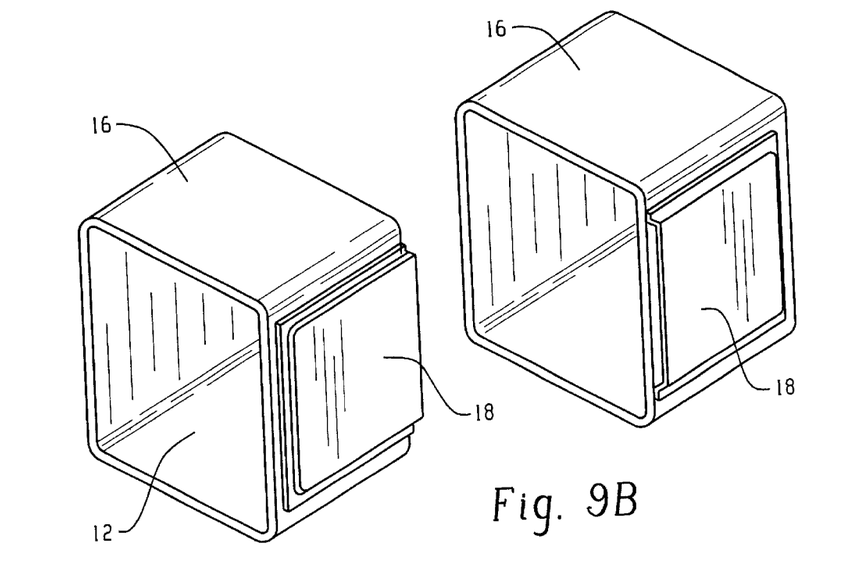

The short sides of pieces of sheet metal 18 can be cut by a cutting operation 36 either along the welding spots located on said short sides or by cutting the sheet metal into sections (FIGS. 9A and 9B) along the entire width where the end edges are welded onto dividing wall 16.

Figure 8A:
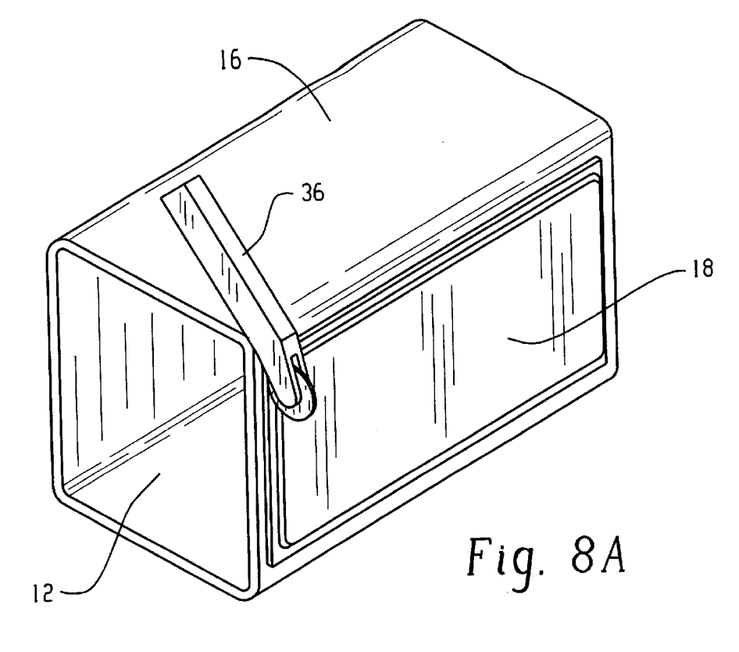
FIGS. 8A and 8B illustrate the short sides of the sheet metal being cut along a weld.
Figure 8B:
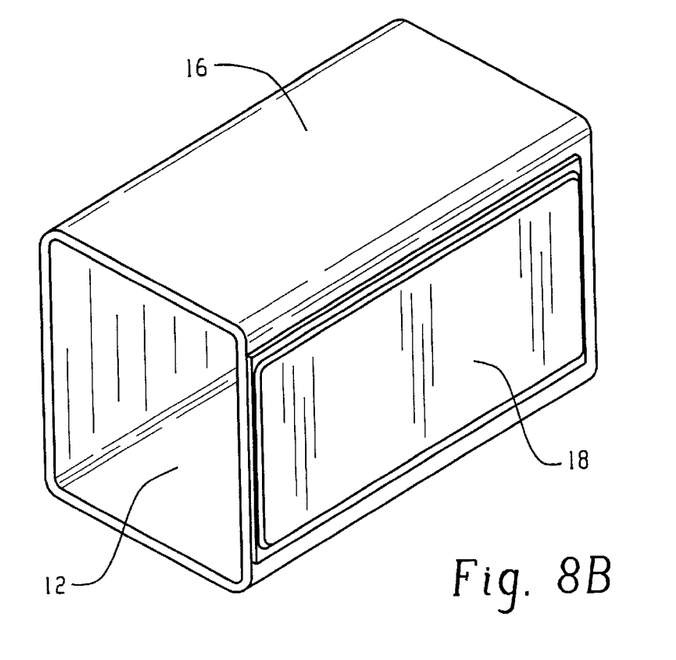

The cutting operation 36 may consist of chipping, grinding or milling when the short sides of the pieces of sheet metal 18 are cut along the welding spots (FIGS. 8A and 8B) that fasten them to walls 16.

Cutting the welding spots by chipping consists in breaking the welding spots using the cutting action of a chisel that is manually operated or fitted in a pneumatic chiseling hammer.

Cutting the welding spots by grinding consists in breaking the welding spots using the abrasive action of a grinding wheel.

Finally, cutting the welding spots by milling consists in breaking the welding spots using a milling cutter.

Either grinding or milling techniques may be used indifferently when the short sides are cut into sections along the entire width.

The chipping, grinding and milling techniques used to cut the short sides of sheet metal 18 are standard techniques known to those skilled in the art. Consequently, no detailed description will be given.

Figure 2:
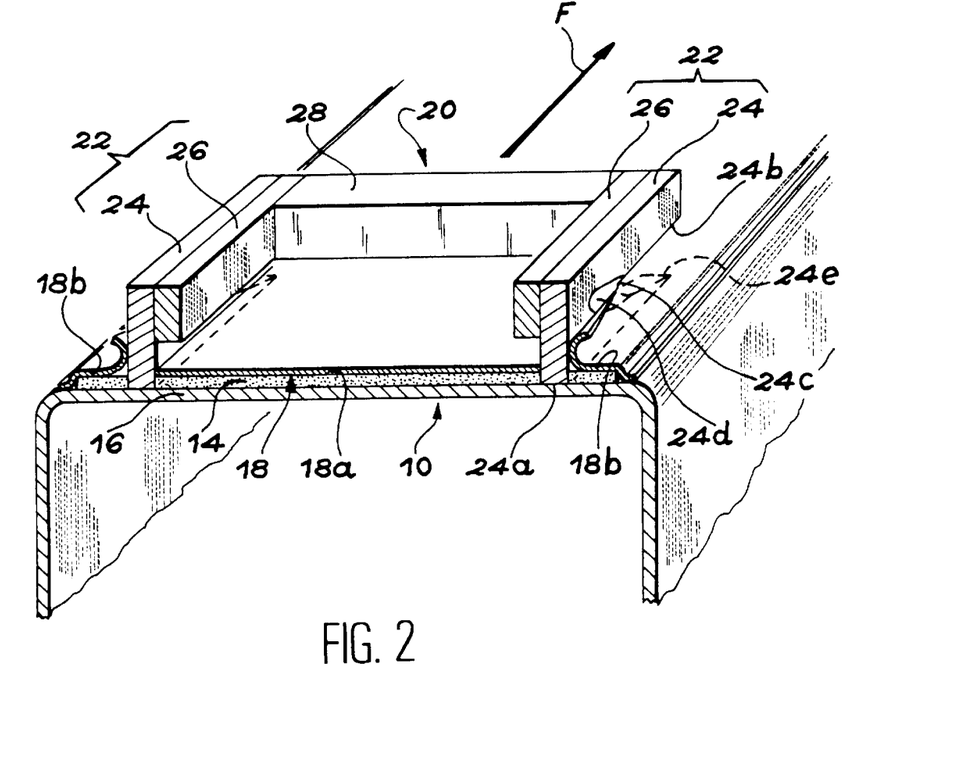
FIG. 2 is a perspective view showing the cutting of the two long sides of one of the pieces of sheet metal in the rack of FIG. 1, said cutting being performed with a cutting head fitted with two fixed blade-fixed blade support assemblies.

The long sides of sheet metal 18 are cut using a cutting head 20 that is displaced continually from one end of the sheet metal to the other, in other words along the entire length of cells 12, parallel to their longitudinal axis, as shown in FIG. 2. This movement is shown by arrow F in FIG. 2. Cutting head 20 is of a minimum size such that it may be inserted in a cell 12 or in the limited space between two adjacent cells (see FIG. 3). Cutting head 20 is, however, also used to cut pieces of sheet metal 18 on the outer surfaces of the peripheral walls of the racks.

In the preferred embodiment of the invention shown in FIG. 2 cutting head 20 is designed such that it is capable of making two simultaneous longitudinal cuts over the entire length of a single piece of sheet metal 18 in a single pass, the cuts being made near the long sides of said sheet metal. In this case cutting head 20 comprises two assemblies 22 that each include a cutting blade 24 and a blade support 26. The two blade-blade support assemblies 22 are connected together by a common bar 28 that is capable of being displaced parallel to the longitudinal axis of cell 12. Means (not shown) are then used to pull or push cutting head 20 in the direction of arrow F, as seen above.

In one version (not shown) cutting head 20 is designed to cut the two long sides of sheet metal 18 in two successive passes. In this version cutting head 20 includes a single assembly 22 comprising a cutting blade 24 and a blade support 26.

In another variant (not shown) cutting head 20 comprises three or four blade-blade support assemblies 22 in order to effect longitudinal cuts on two pieces of sheet metal 18 that face each other.

Each blade-blade support assembly 22 may also be replaced in each case by a fixed or movable single blade 24.

Cutting blade 24 and blade support 26 may be either fixed or movable in each of the blade-blade support assemblies 22.

In the embodiment shown as an example in FIG. 2 blades 24 and blade supports 26 are fastened relative to bar 28 of cutting head 20.

More precisely each cutting blade 24 comprises an edge, reference 24a, that is capable of coming to bear on the surface of wall 16 to which sheet metal 18 is applied as well as a scalloped edge at the front relative to the direction of displacement of cutting head 20, said direction being shown by arrow F in FIG. 2. On the surface of blade 24 opposite the adjacent long side of the sheet metal 18 and adjacent to blade support 26 the bottom of scallop 24b constitutes a concave cutting edge 24c. On the side opposite blade support 26, i.e. on the surface facing the adjacent long side of sheet metal 18, concave cutting edge 24c is extended by a tapered surface 24d.

When edge 24a of cutting blade 24 comes to bear on the surface of wall 16 to which sheet metal 18 is applied concave cutting edge 24c meets sheet metal 18 or is slightly above it. Sheet metal 18 is therefore automatically cut when cutting head 20 is displaced in the direction of arrow F.

Relative to the displacement direction of cutting head 20, front edge 24a of blade 24 constitutes a cutting edge 24e defined by the edge of scallop 24b. This layout constitutes a corner when cutting edge 24e is pressed against the surface of wall 16 and cuts layer 14 of neutron-absorbing material and sheet metal 18 simultaneously.

Blade support 26 is in contact with the part of blade 24 located above scallop 24b. More precisely blade support 26 is placed against the surface of blade 24 opposite the adjacent long side of sheet metal 18 to be cut.

Central section 18a of sheet metal 18 located between the two blades 24 is thus gradually detached from lateral strips 18b of said sheet metal as cutting head 20 is displaced in the direction of arrow F. Furthermore, tapered surfaces 24d of blades 24 gradually fold the cut lateral strips 18b of surface 18 upwards. This characteristic enables the sections of layer 14 of neutron-absorbing material that lie under the lateral strips 18b of sheet metal 18 to be freed and removed subsequently.

Figure 5:
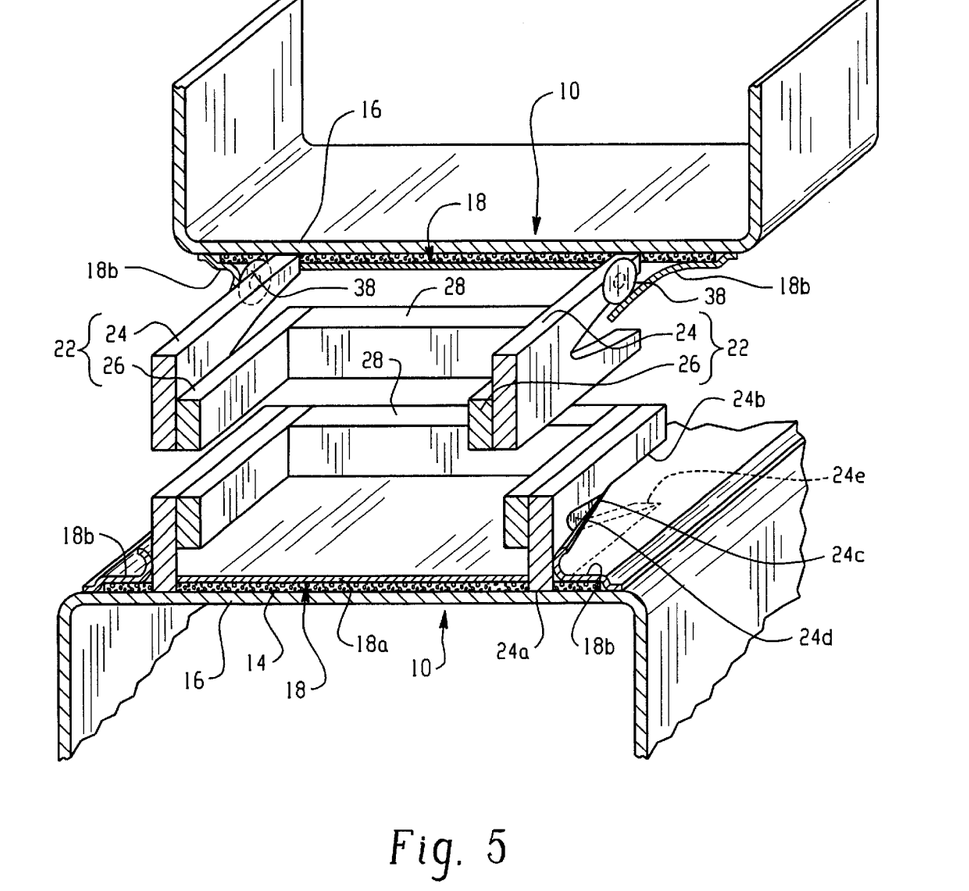
FIG. 5 is a perspective view showing the cutting of the two long sides of two of the pieces of sheet metal in the rack of FIG. 1, said cutting being performed with a cutting head fitted with four fixed blade-fixed blade support assemblies.

Preferably lateral strips 18b of sheet metal 18 are lifted using bases or rollers 38 (FIG. 5) that are fitted downstream of blades 24, relative to the displacement direction of the cutting head, in cutting head 20. By lifting lateral strips 18b, that are still welded to wall 16, the bases or rollers enable the entire layer 14 of neutron-absorbing material to be removed while creating the space required to fit a replacement plate of neutron-absorbing material.

As mentioned above each blade support 26 may also be movable relative to bar 28 of cutting head 20. In this case each blade support is constituted, for example, by a roller 40 (FIG. 7) that is in contact with the outer surface of sheet metal 18 during cutting. When cutting head 20 is displaced the roller is then driven to rotate.

Figure 6:
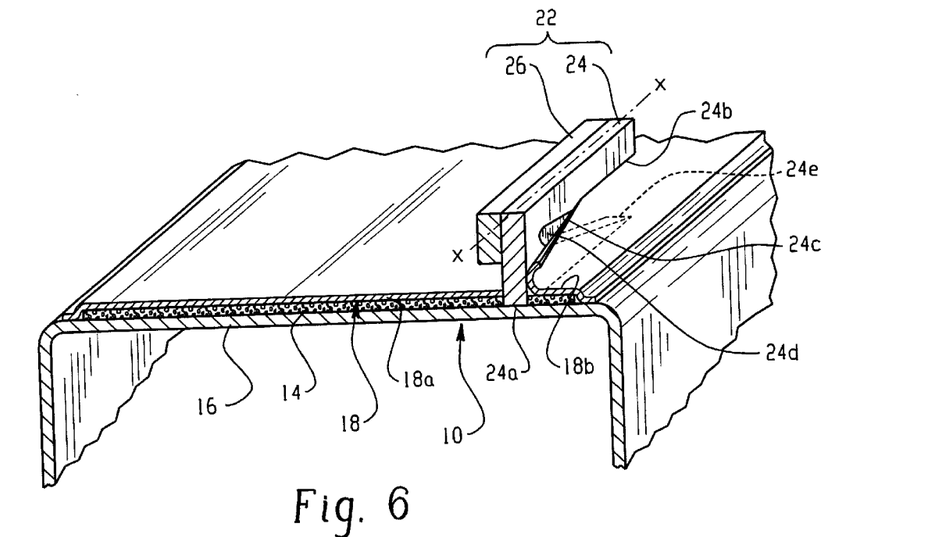
FIG. 6 is a perspective view showing the cutting of the long side of a piece of sheet metal in the rack of FIG. 1, said cutting being performed with a cutting head fitted with a single fixed blade-fixed blade support assembly.
Figure 7:
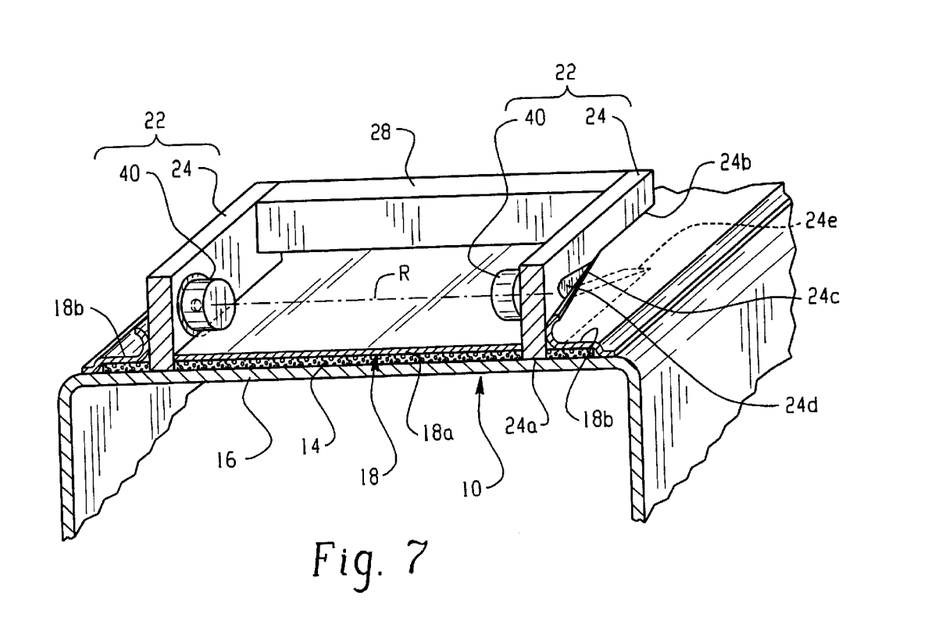
FIG. 7 is a perspective view showing the blade support constituting a roller assembly.

If the cutting blade of each blade-blade support assembly 22 is movable each of the blades is actuated by a mechanical device driven by a motor or by any type of jack, for example electric, hydraulic, pneumatic, etc. The blades are then displaced in an alternating direction along axis X as shown in FIG. 6 or rotating movement around axis R as shown in FIG. 7. In this case sheet metal 18 is chiseled between the movable blade and the fixed support as shown in FIG. 6 or movable blade support as shown in FIG. 7.

When the two longitudinal cuts of sheet metal 18 are completely finished both said sheet metal and the layer of neutron-absorbing material 14 that has been uncovered are removed from the rack.

Any suitable tooling, such as a scraper or a traction tool, may be used to remove layer 14. Any remaining neutron-absorbing material residual on walls 16 is then removed.

In order to finish the refurbishing the storage racks new plates of neutron-absorbing material, made of boron steel for example, are then set into place on walls 16 such that they restore the rack with its original nuclear protection characteristics.

The new plates of neutron-absorbing material are placed preferably in the extended rectangle, the inside of which is defined by the remaining edge sections of pieces of sheet metal 18. The plates are fastened using added tabs (not shown) that are welded onto the remaining edge sections of the pieces of sheet metal or using one of the techniques described below in reference to FIGS. 3 and 4 respectively.

Figure 3:
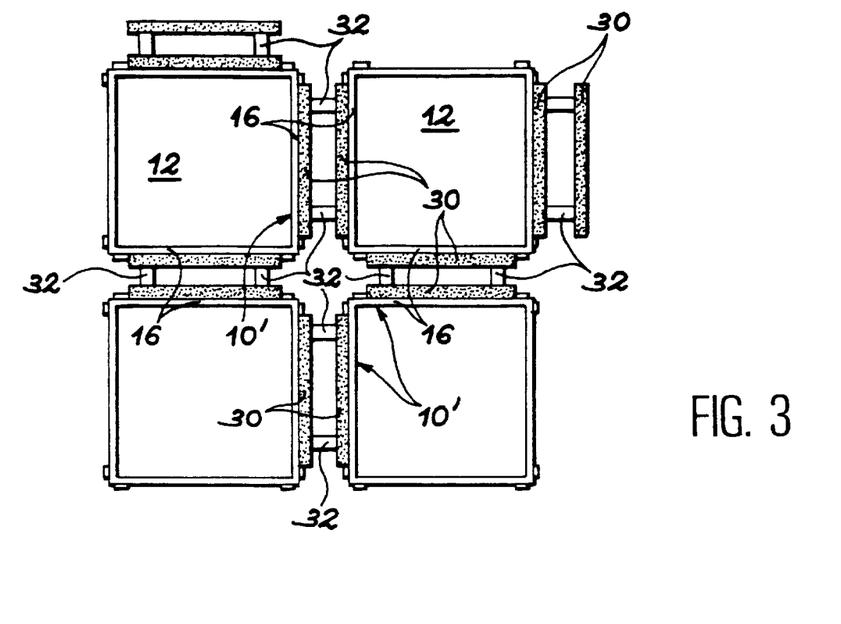
FIG. 3 is a similar view to that of FIG. 1 showing an example of a refurbished rack intended to store new atomic fuel assemblies.

FIG. 3 relates to a rack intended to store new assemblies. In this example cells 12 are separated by partitions 10' each comprising two dividing walls 16 that belong to two different tubes defining two adjacent cells 12. The two walls 16 of a same partition 10' are separated from each other by a distance that is sufficient for each wall to have been initially fitted with a layer 14 of neutron-absorbing material held on the outer face of the wall by a piece of welded sheet metal 18, as described above.

According to the invention the two short sides of each piece of sheet metal 18 are cut along the welding spots or into sections then the two long sides of said sheet metal are cut using a cutting head 20 (see FIG. 2) the measurements of which enable it to pass between the adjacent partitions 10'. In this case cutting head 20 (FIG. 5) can comprise one to four blade-blade support assemblies 22 or one to four single blades such that it is able to make up to four longitudinal cuts in two pieces of sheet metal 18 that face each other in a single pass. Layers 14 of neutron-absorbing material are then removed and replaced with new plates 30 that are held in place by shim spacers 32 inserted between said plates.

Figure 4:
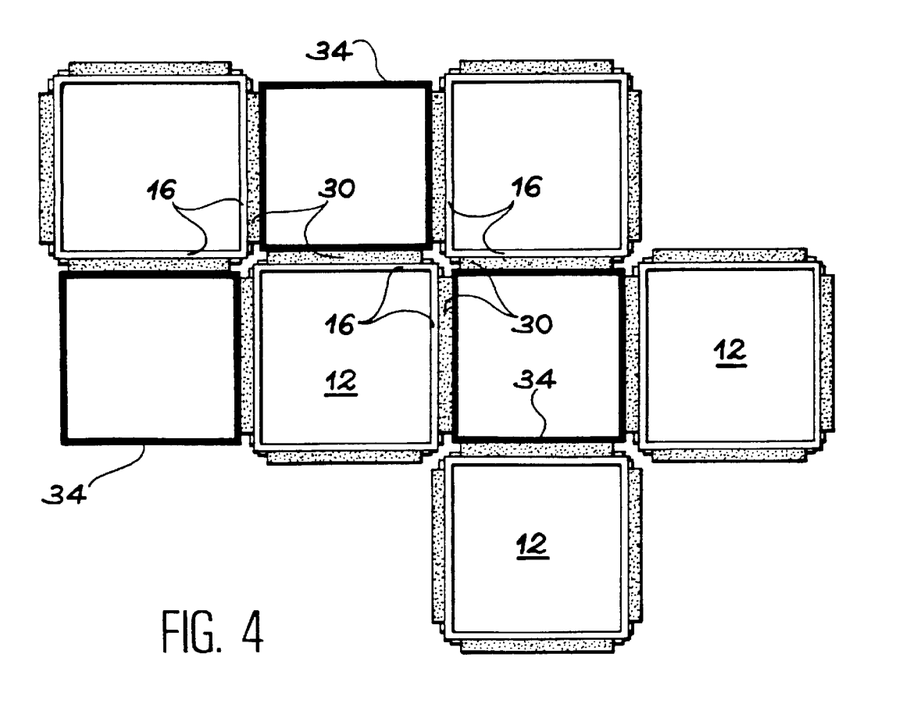
FIG. 4 is a similar view to that of FIGS. 1 and 3 showing an example of a refurbished rack intended to store irradiated atomic fuel assemblies.

FIG. 4 relates to a rack intended to store used assemblies. This rack is similar to that described above in FIG. 1. It is shown after sheet metal 18 has been cut, layers 14 of neutron-absorbing material have been removed and after they have been replaced with new plates 30 of neutron-absorbing material. In this example plates 30 are held in place using thin tubes 34, for example 0.5 mm or 0.8 mm thick, in cells 12 that are constituted between the tubes defining walls 16. Tubes 34 may be in contact with plates 30 of neutron-absorbing material, as in FIG. 4, or they may not be in contact with said plates (not shown). Contact may be made using spacers or any other equivalent system.

The sections of the remaining edges of sheet metal 18 may be leveled before the new plates of neutron-absorbing material are set into place if the characteristics of the plates require such an operation. This operation can be performed using any suitable tooling, such as a water jet, tools for chiseling or breaking the welds, etc.

The plates of neutron-absorbing material are then fastened using any of the methods described above onto dividing walls 16 thus leveled.

It should be noted that any type of new plates of neutron-absorbing material may be used depending on the rack concerned.

When the rack has been completely refurbished it may be used once again under similar conditions to those of a new rack. The cost of refurbishing is, however, considerably less than replacing the entire rack.

What is claimed is:

1. Method for cutting a substantially rectangular piece of sheet metal, having two short sides and two long sides welded onto a wall of a nuclear fuel assembly storage rack cell, such that a layer of neutron-absorbing material, held initially between the sheet metal and said wall, may be removed, wherein said method comprises the following stages:

cutting the two short sides of the sheet metal;

cutting the two long sides of the sheet metal in a continual movement from one end of the sheet metal to the other with a cutting head that includes at least one single blade or one blade assembly comprising at least one blade and one blade support.

2. Method of claim 1 wherein both long sides of the sheet metal are cut simultaneously with said cutting head wherein said cutting head of said blade includes two assemblies or two of said single blades.

3. Method of claim 1 wherein the two long sides of the sheet metal are cut by making two successive passes with said cutting head wherein said cutting head includes said blade assembly or said one single blade.

4. Method of claim 1 wherein the two long sides of two pieces of sheet metal facing each other are cut simultaneously in a single pass with said cutting head wherein said cutting head includes four of said blade assemblies or four of said single blades.

5. Method of claim 1 wherein each blade is fixed.

6. Method of claim 1 wherein each blade is a movable blade that operates in an alternating or rotating movement when the cutting head is displaced.

7. Method of claim 1 wherein each of the blade assemblies of the cutting head comprises a fixed blade support.

8. Method of claim 1 wherein each of the blade assemblies of the cutting head comprises a movable blade holder which is either a roller or a movable blade support that is driven to rotate when the cutting head is displaced or is a movable blade support that operates in an alternating movement.

9. Method of claim 1 wherein after the two long sides of the sheet metal have been cut two remaining side strips are lifted by at least one lifting device that is borne by the cutting head.

10. Method of claim 1 wherein the sheet metal, that is welded onto the wall with welding spots, is cut along the welding spots on the short sides either by chipping, grinding or milling.

11. Method of claim 1 wherein the two short sides of the sheet metal are cut into sections along all the width of the sheet metal.

12. Method of claim 11 wherein the sheet metal is either ground- or milled-off into sections.

* * * * *